(12) United States Patent
Jung et al.

(10) Patent No.: US 11,082,653 B2
(45) Date of Patent: Aug. 3, 2021

(54) IMAGE SENSOR AND PIXEL ARRAY WHICH GENERATE A PIXEL SIGNAL BASED ON A PLURALITY OF PIXELS, AND OPERATION METHOD OF THE IMAGE SENSOR

(71) Applicant: SAMSUNG ELECTRONICS CO., LTD., Suwon-si (KR)

(72) Inventors: Yun-Hwan Jung, Hwaseong-si (KR); Sun-Yool Kang, Hwaseong-si (KR); Kyung-Min Kim, Seoul (KR); Hee-Sung Chae, Seoul (KR); Jae-Seung Han, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/445,754

(22) Filed: Jun. 19, 2019

(65) Prior Publication Data
US 2020/0007808 A1 Jan. 2, 2020

(30) Foreign Application Priority Data
Jun. 27, 2018 (KR) .................. 10-2018-0073771

(51) Int. Cl.
*H04N 5/374* (2011.01)
*H04N 5/357* (2011.01)
*H04N 5/365* (2011.01)
*H04N 5/378* (2011.01)

(52) U.S. Cl.
CPC ......... *H04N 5/3741* (2013.01); *H04N 5/3575* (2013.01); *H04N 5/365* (2013.01); *H04N 5/378* (2013.01)

(58) Field of Classification Search
CPC .... H04N 5/3741; H04N 5/3575; H04N 5/365; H04N 5/378; H04N 5/37452; H04N 5/3595; H04N 5/374; H04N 5/357
See application file for complete search history.

(56) References Cited

U.S. PATENT DOCUMENTS

| | | |
|---|---|---|
| 4,581,651 A | 4/1986 | Miyata et al. |
| 7,382,409 B2 | 6/2008 | Hiyama et al. |
| 8,625,014 B2 | 1/2014 | Yoo et al. |
| 9,860,460 B2* | 1/2018 | Kim ............ H04N 5/3532 |
| 2007/0258000 A1 | 11/2007 | Kondo |
| 2008/0158403 A1 | 7/2008 | Itano et al. |
| 2009/0207290 A1* | 8/2009 | Kondo ......... H04N 5/3598 348/302 |
| 2012/0120300 A1 | 5/2012 | Dai |
| 2012/0249851 A1 | 10/2012 | Martinussen |

(Continued)

OTHER PUBLICATIONS

Office Action Issued in Corresponding U.S. Appl. No. 16/844,251 dated May 25, 2021.

*Primary Examiner* — Gevell V Selby
(74) *Attorney, Agent, or Firm* — F. Chau & Associates, LLC

(57) ABSTRACT

An image sensor includes a pixel array including a first pixel and a second pixel which are connected to a first column line, and a row driver configured to control a read operation of the second pixel. A voltage of the first column line is determined based on a higher voltage among a voltage of a floating diffusion node of the first pixel and a voltage of a floating diffusion node of the second pixel during the read operation of the second pixel.

20 Claims, 12 Drawing Sheets

(56) References Cited

U.S. PATENT DOCUMENTS

| | | |
|---|---|---|
| 2016/0198108 A1 | 7/2016 | Guidash et al. |
| 2016/0261810 A1 | 9/2016 | Kobuse |
| 2017/0126997 A1* | 5/2017 | Ha .................... H04N 5/37457 |
| 2017/0289470 A1 | 10/2017 | Deng et al. |
| 2019/0393259 A1* | 12/2019 | Kanehara .......... H01L 27/14636 |

* cited by examiner

IMAGE SENSOR AND PIXEL ARRAY WHICH GENERATE A PIXEL SIGNAL BASED ON A PLURALITY OF PIXELS, AND OPERATION METHOD OF THE IMAGE SENSOR

CROSS-REFERENCE TO RELATED APPLICATION

This application claims priority under 35 U.S.C. § 119 to Korean Patent Application No. 10-2018-0073771, filed on Jun. 27, 2018 in the Korean Intellectual Property Office, the disclosure of which is incorporated by reference herein in its entirety.

TECHNICAL FIELD

Exemplary embodiments of the inventive concept relate to an image sensor and a pixel array, and more particularly, to an image sensor and a pixel array which generate a pixel signal based on a plurality of pixels.

DISCUSSION OF RELATED ART

An image sensor is an apparatus that captures a two-dimensional or a three-dimensional image of an object. The image sensor generates an image of an object by using a photoelectric converting device that responds to an intensity of light reflected from the object. Recently, with the development of complementary metal-oxide-semiconductors (CMOS), CMOS image sensors have been widely used.

SUMMARY

According to an exemplary embodiment of the inventive concept, an image sensor includes a pixel array including a first pixel and a second pixel which are connected to a first column line, and a row driver configured to control a read operation of the second pixel. A voltage of the first column line is determined based on a higher voltage between a voltage of a floating diffusion node of the first pixel and a voltage of a floating diffusion node of the second pixel during the read operation of the second pixel.

According to an exemplary embodiment of the inventive concept, a pixel array includes a first row pixel configured to generate a first pixel signal in response to receiving a clamp signal from outside, and a second row pixel configured to generate a second pixel signal based on an output of a photodiode. A voltage applied to a column line connected to the first row pixel and the second row pixel is a voltage based on at least one of the first pixel signal and the second pixel signal.

According to an exemplary embodiment of the inventive concept, in an operation method of an image sensor including a plurality of pixels, the operation method includes resetting a plurality of pixels in a reset operation, applying a clamp signal, a voltage level of which decreases from a first voltage to a second voltage which is less than the first voltage during the reset operation, to a first row pixel, and turning on a transfer transistor to receive an output of a photodiode of a second row pixel.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
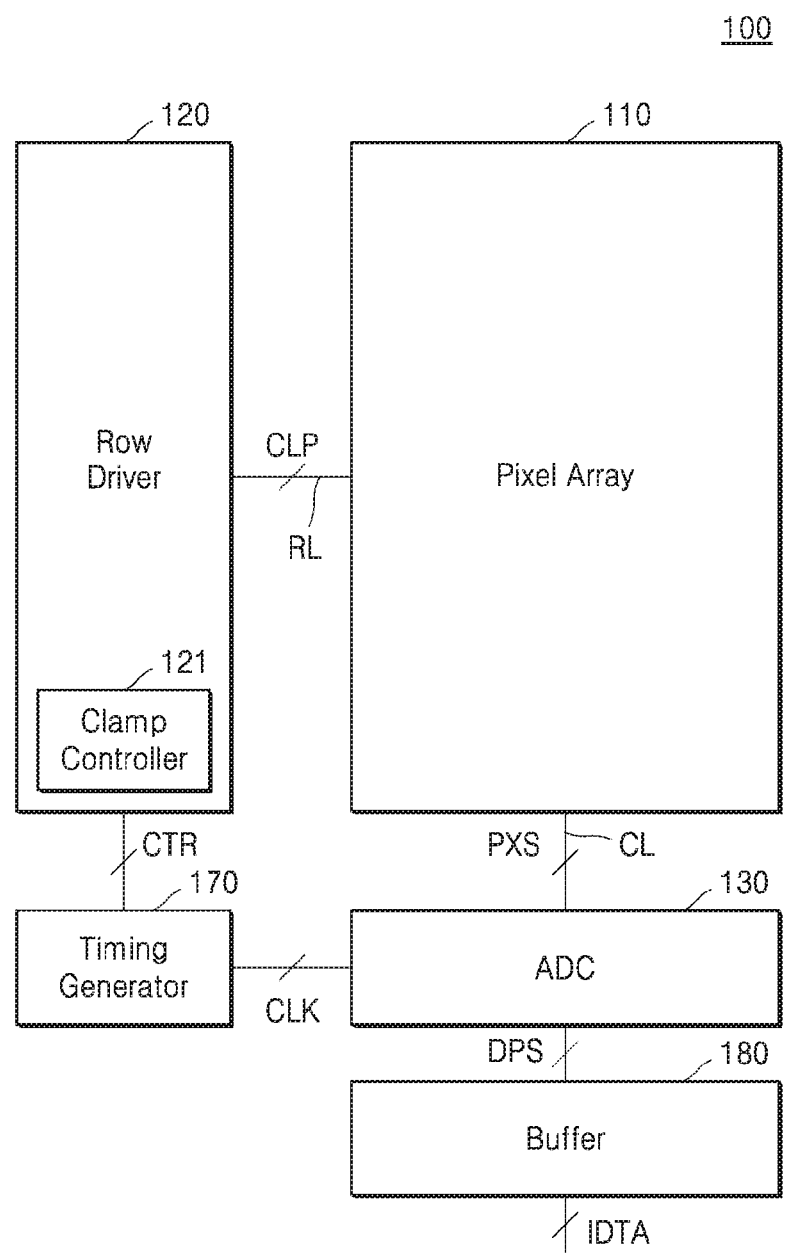
FIG. 1 is a block diagram of an image sensor according to an exemplary embodiment of the inventive concept.

Exemplary embodiments of the inventive concept provide an image sensor and a pixel array configured to detect a pixel signal output from a pixel to which a photocharge is applied, by using another pixel.

Hereinafter, exemplary embodiments of the inventive concept will be described in detail with reference to the accompanying drawings. Like reference numerals may refer to like elements throughout this application.

FIG. 1 is a block diagram of an image sensor according to an exemplary embodiment of the inventive concept.

An image sensor 100 may include a pixel array 110, a row driver 120, an analog to digital converter 130 (hereinafter referred to as an ADC 130), a timing generator 170, and a buffer 180.

The image sensor 100 may be mounted on an electronic device which has an image or light detecting function. For example, the image sensor 100 may be mounted on an electronic device such as a camera, a smartphone, a wearable device, an Internet of Things (IoT) device, a tablet personal computer (PC), a personal digital assistant (PDA), a portable multimedia player (PMP), a navigation apparatus, or the like. In addition, the image sensor 100 may be mounted on an electronic device configured as a component in a vehicle, furniture, a manufacturing facility, a door, various measuring instruments, or the like.

The pixel array 110 may be accessed via a plurality of row lines RL and a plurality of column lines CL, and include a plurality of pixels arranged in a matrix form. Each of the plurality of pixels may include a light detecting device. The light detecting device may generate a photocharge in response to light incident from outside, and the plurality of pixels may convert the photocharge into a voltage or a current and output the same as a pixel signal PXS.

The row driver 120 may drive the pixel array 110 in row units. The row driver 120 may select at least one row line RL of the pixel array 110 according to a control signal CTR received from the timing generator 170. A pixel connected to the selected row line RL outputs the pixel signal PXS. The pixel signal PXS may include a reset signal and an image signal. The row driver 120 may control a read operation of a pixel. Hereinafter, the read operation may refer to an operation of resetting a pixel and outputting the pixel signal PXS of a size corresponding to a light intensity from the pixel.

The row driver 120 may include a clamp controller 121. The clamp controller 121 may transmit a clamp signal CLP for generating the pixel signal PXS in the pixel array 110. In addition, the clamp controller 121 may be electrically connected to at least one pixel among the plurality of pixels of the pixel array 110. In this case, a capacitor may be included between the clamp controller 121 and the at least one pixel. In addition, the clamp controller 121 may be electrically connected to a floating diffusion node FD of at least one of the plurality of pixels. The clamp controller 121 may transmit either a first voltage or a second voltage as the clamp signal CLP according to the control signal CTR. In this case, the first voltage may be greater than the second voltage.

The ADC 130 converts an analog pixel signal input from the pixel array 110 into a digital signal. For example, the ADC 130 may generate a result of comparing the pixel signal PXS to a ramp signal so as to effectively detect a difference between the reset signal and the image signal. The ADC 130 may count signals output as a compared result and convert the signals into digital signals.

The timing generator 170 may generally control the image sensor 100. For example, an operation or a timing of the row driver 120 and the ADC 130 may be controlled by respectively transmitting the control signal CTR and a clock signal CLK to the row driver 120 and the ADC 130. For example, the timing generator 170 may provide the control signal CTR to the row driver 120 and the clamp signal CLP may be controlled. The clamp signal CLP may have different voltage values according to the control signal CTR.

After the buffer 180 temporarily stores a digital pixel signal DPS output from the ADC 130, the buffer 180 may sense and amplify the same and output the same as image data IDTA.

According to an exemplary embodiment of the inventive concept, the row driver 120 may apply the first voltage and the second voltage to the plurality of pixels of the pixel array 110, where the second voltage is less than the first voltage. A first pixel, which receives the second voltage, may be connected to a same column line CL as a second pixel. Accordingly, the pixel signal PXS may be determined according to at least one of an output voltage of the first pixel and the second pixel. In other words, the row driver 120 may provide the clamp signal CLP to the first pixel such that a voltage output from the second pixel may not be lower than a voltage of the first pixel. Accordingly, band noise generated when a second pixel output voltage value is excessively lowered due to an application of bright light to the second pixel may be controlled.

Figure 2:
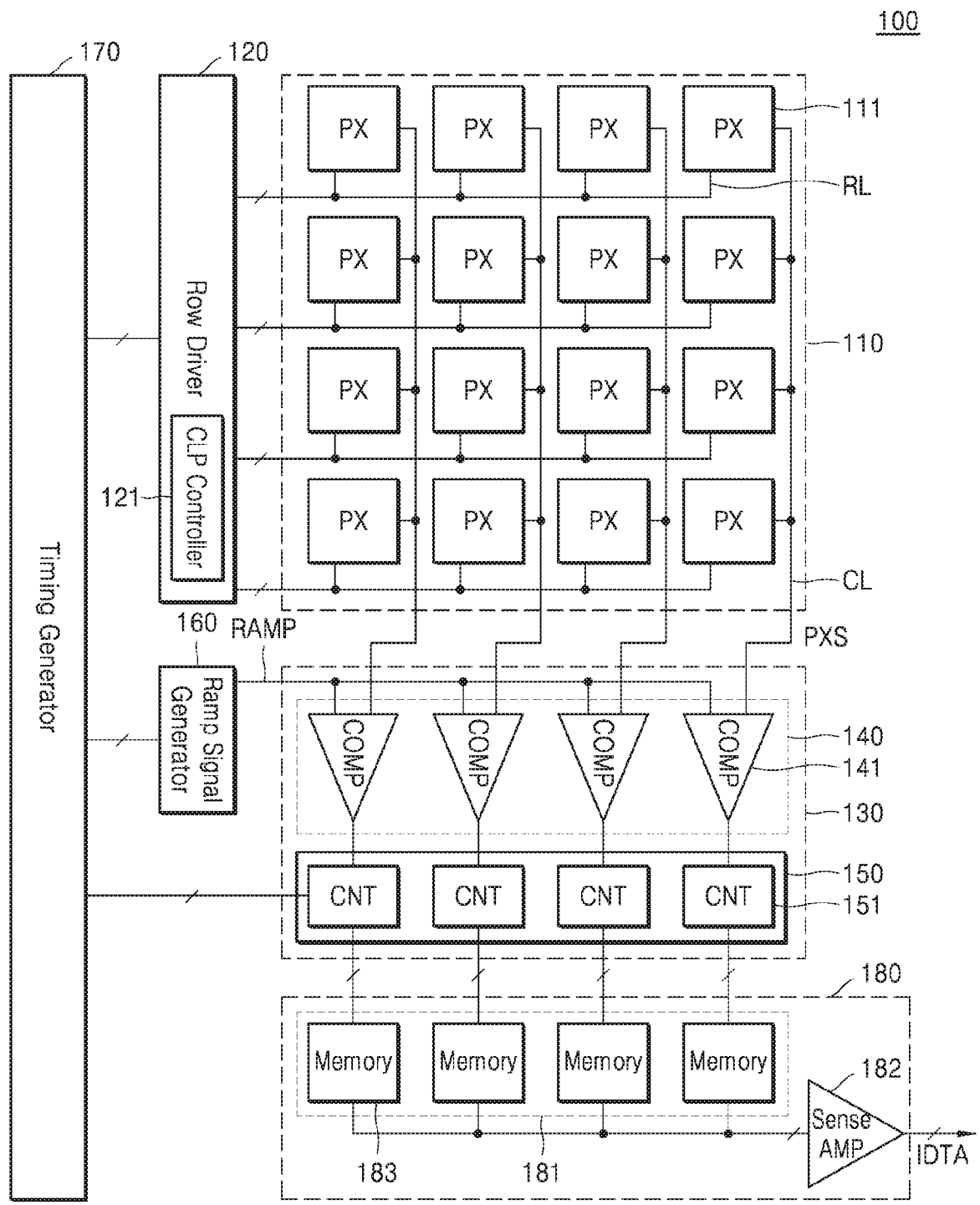
FIG. 2 is a block diagram of the image sensor of FIG. 1 according to an exemplary embodiment of the inventive concept.

FIG. 2 is a block diagram of the image sensor of FIG. 1 according to an exemplary embodiment of the inventive concept.

The pixel array 110 may respectively be accessed via the plurality of row lines RL and the plurality of column lines CL and include a plurality of pixels 111 arranged in a matrix form. For example, the plurality of row lines RL may include four row lines RL, where each row line RL, as described later with reference to FIG. 4, may transmit a control signal to a reset transistor, a transfer transistor, and a selection transistor, and transmit a clamp signal to the pixels 111.

Each of the plurality of pixels 111 may include a light detecting device For example, the light detecting device may include a photodiode, a phototransistor, a port gate, a pinned photodiode, or the like. Each of the plurality of pixels 111 may include at least one light detecting device; for example, each of the plurality of pixels 111 may include a plurality of light detecting devices. The plurality of light detecting devices may be stacked on one another in an incident direction of light.

Each of the plurality of pixels 111 may detect light in a particular spectrum region. For example, the plurality of pixels 111 may include a red pixel converting light in a red spectrum region into an electric signal, a green pixel converting light in a green spectrum region into an electric signal, and a blue pixel converting light in a blue spectrum region into an electric signal. A color filter configured to transmit light in a particular spectrum region may be arranged above each of the plurality of pixels 111.

The plurality of pixels 111 may detect light by using the light detecting device and convert the light into the pixel signal PXS, which is an electrical signal. For example, the plurality of pixels 111 may emit many electrons (photocharges) when bright light is applied. A voltage value output from the light detecting device may be lowered with respect to brighter light. Band noise may occur when an output voltage value output from the light detecting device is excessively low.

The row driver 120 may, for example, drive the pixel array 110 in row units and control a read operation of at least one pixel 111. The row driver 120 may decode a row control signal (e.g. an address signal) generated in the timing generator 170 and select at least one of the row lines RL in the pixel array 110 in response to the decoded row control signal. For example, the row driver 120 may generate a row selection signal. The pixel array 110 may output the pixel signal PXS from the row selected by using the row selection signal provided from the row driver 120. For example, the pixel signal PXS may have one of a voltage corresponding to a reset state, a voltage corresponding to the photocharge, or a clamp voltage.

The clamp controller 121 may transmit the clamp signal CLP to at least one of the plurality of pixels 111. For example, the clamp controller 121 may apply the clamp signal CLP to a floating diffusion node of the pixel 111. Meanwhile, the row driver 120 may generate the row selection signal to select two row lines RL. For example, a signal selecting the plurality of pixels 111 included in a first row and a signal selecting the plurality of pixels 111 included in a second row may be generated. The clamp controller 121 may transmit the clamp signal CLP by alternately applying the first voltage or the second voltage to one row line RL out of the two selected row lines RL. For example, the first voltage may be greater than the second voltage. The first voltage may be a power supply voltage VDD and the second voltage may be a voltage which is lower than the power supply voltage VDD.

According to an exemplary embodiment of the inventive concept, the clamp controller 121 may apply the first voltage to the first pixel, while the row driver 120 turns on the reset transistor included in the pixels 111. In this case, a floating diffusion node of the first pixel may be maintained as a voltage corresponding to the first voltage, After the row driver 120 turns on the reset transistor included in the pixel 111, the clamp controller 121 may apply the second voltage to the first pixel. In this case, the floating diffusion node of the pixel 111 may change the voltage from a voltage corresponding to the first voltage to a voltage corresponding to the second voltage. Since the first voltage is greater than the second voltage, in a case where the clamp controller 121 applies the second voltage, a voltage size of the floating diffusion node may drop.

Meanwhile, the clamp controller 121 may maintain a line connecting the clamp controller 121 to the second pixel in an opened state. The row driver 120 may apply the second voltage to the first pixel and turn on the transfer transistor of the second pixel after a fixed time. Accordingly, a current and/or a voltage according to the photocharge output from the light detecting device of the second pixel may be applied to the floating diffusion node of the second pixel. A source follower transistor of the first pixel and the second pixel may connect to the floating diffusion node and the selection transistor of each pixel. In this case, the floating diffusion node may be connected to a gate terminal of the drive transistor and only a high source follower transistor having a high voltage at the floating diffusion node may apply a voltage to the column line CL through the selection transistor. Additionally, at least one of the transistors may include an NMOS transistor.

The ADC 130 may convert an analog pixel signal input from the pixel array 110 into a digital signal. The ADC 130 may include a comparison block 140 and a counter block 150.

The comparison block 140 compares the pixel signal PXS output from a unit pixel accessed via any one of the column lines CL in the pixel array 110 with a ramp signal RAMP. The comparison block 140 includes a plurality of comparison circuits 141 corresponding to each column, and each of the plurality of comparison circuits 141 is connected to the pixel array 110 and a ramp signal generator 160 generating the ramp signal RAMP.

Each comparison circuit 141 may receive and compare the pixel signal PXS to the ramp signal RAMP generated from the ramp signal generator 160, and a comparison result signal may be output to an output terminal of the comparison circuit 141.

The comparison circuit 141 may generate a comparison result signal to which a correlated double sampling technique is applied and may be referred to as a correlated double sampling circuit. The pixel signals PXS output from the plurality of pixels 111 may have a deviation due to a characteristic difference in logic for outputting the pixel signal PXS and/or a pixel-unique characteristic (e.g. fixed pattern noise) for each pixel. To compensate for a deviation between such pixel signals, obtaining a reset component (or a reset signal) and an image component (or an image signal) with respect to each of the pixel signals and extracting a difference between the reset component and the image component as a valid signal component is called correlated double sampling. As such, the comparison circuit 141 may output a comparison result signal to which the correlated double sampling technique is applied.

The ramp signal generator 160 may generate the ramp signal RAMP. The ramp signal generator 160 may operate based on a ramp control signal provided by the timing generator 170. The ramp control signal may include a ramp enable signal, a mode signal, or the like. The ramp signal generator 160 may generate the ramp signal RAMP having a slope set based on the mode signal when the ramp enable signal is activated.

The counter block 150 may include a plurality of counters 151. Each of the plurality of counters 151 may be connected to a corresponding output terminal of the comparison circuits 141, and may be counted based on an output of each comparison circuit 141. A counter control signal may include a counter clock signal, a counter reset signal controlling a reset operation of the plurality of counters 151, and an inversion signal inverting an internal bit of each of the plurality of counters 151. The counter block 150 counts the comparison result signal and outputs the same as a digital signal according to the counter clock signal.

The counter 151 may include an up/down counter, a bit-wise inversion counter, or the like. At this time, a bit-wise inversion counter may perform an operation similar to an up/down counter. For example, the bit-wise inversion counter may perform a function of producing a 1's complement by inverting all bits inside the bit-wise inversion counter when a function of performing only an up-count and a particular signal arrives. The bit-wise inversion counter may convert a reset count to a 1's complement, in other words, a negative value, by inverting the reset count after performing the reset count.

The buffer 180 may include a column memory block 181 and a sense amplifier 182, where the column memory block 181 may include a plurality of memories 183. Each of the plurality of memories 183 may temporarily store a digital signal output from a corresponding one of the plurality of counters 151, and may output the same to the sense amplifier 182. The sense amplifier 182 may sense and amplify the digital signal output from the plurality of memories 183. The sense amplifier 182 may output amplified digital signals as the image data IDTA.

Accordingly, the pixel signal PXS may be maintained above a certain voltage (e.g. a clamp voltage) value and various pieces of noise generated in the pixel 111 may be prevented during the read operation of the second pixel by alternately applying the first voltage and the second voltage to the floating diffusion node of the first pixel. In addition, a precise clamping technique may be realized since the first pixel, positioned adjacent to the second pixel and providing a low parasitic resistance value, may be operated as a clamping circuit without the need to design an additional layer or a circuit to remove the pieces of noise. In other words, the first pixel may operate as a pixel of a clamp row for clamping the voltage of the pixel signal PXS of the second pixel during the read operation of the second pixel.

Figure 3A:
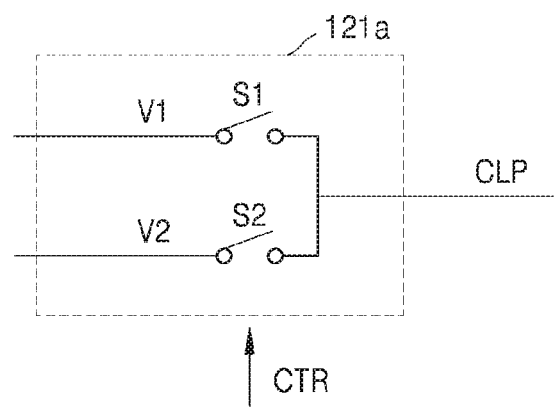
FIGS. 3A and 3B illustrate a clamp controller according to exemplary embodiments of the inventive concept.
Figure 3B:
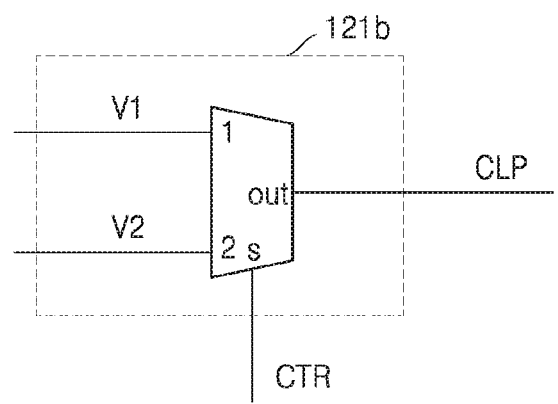

FIGS. 3A and 3B illustrate a clamp controller according to exemplary embodiments of the inventive concept.

Referring to FIG. 3A, a clamp controller 121a may output either a first voltage V1 or a second voltage V2 as the clamp signal CLP. The clamp controller 121a may include a first switch S1 and a second switch S2, and may maintain an opened or a short-circuit state according to the control signal CTR applied from outside of the clamp controller 121a. For example, the clamp controller 121a may receive the first voltage V1 and the second voltage V2 and control at least one of the first switch S1 and the second switch S2 to be in the opened or the short-circuit state according to the control signal CTR received from the timing generator 170. The clamp controller 121a may output either the first voltage V1 or the second voltage V2 as the clamp signal CLP.

The clamp controller 121a may alternately output the first voltage V1 and the second voltage V2 at a prefixed time interval. For example, the first voltage V1 may be applied to the first pixel and then the second voltage V2 may be applied during the read operation of the second pixel, and a voltage difference of the clamp signals may be made to be a difference between the first voltage V1 and the second voltage V2.

According to an exemplary embodiment of the inventive concept, in a case where the timing generator 170 applies a reset signal, the clamp controller 121a may be controlled to make the first switch S1 short-circuit and the second switch S2 be opened. Thereafter, the timing generator 170 may apply a selection signal to the first pixel and the second pixel, and then, after a prefixed time, the clamp controller 121a may be controlled to make the first switch S1 be opened and the second switch S2 short-circuit.

Referring to FIG. 3B, a clamp controller 121b may include a multiplexer (MUX). The MUX may receive the first voltage V1 through a first input terminal and receive the second voltage V2 through a second input terminal, and output one of the voltages input to the input terminal according to the control signal CTR applied to a selection terminal. The clamp controller 121b shown in FIG. 3B may perform a same or similar operation as the clamp controller 121a shown in FIG. 3A, and thus a detailed description thereof will be omitted.

Figure 4:
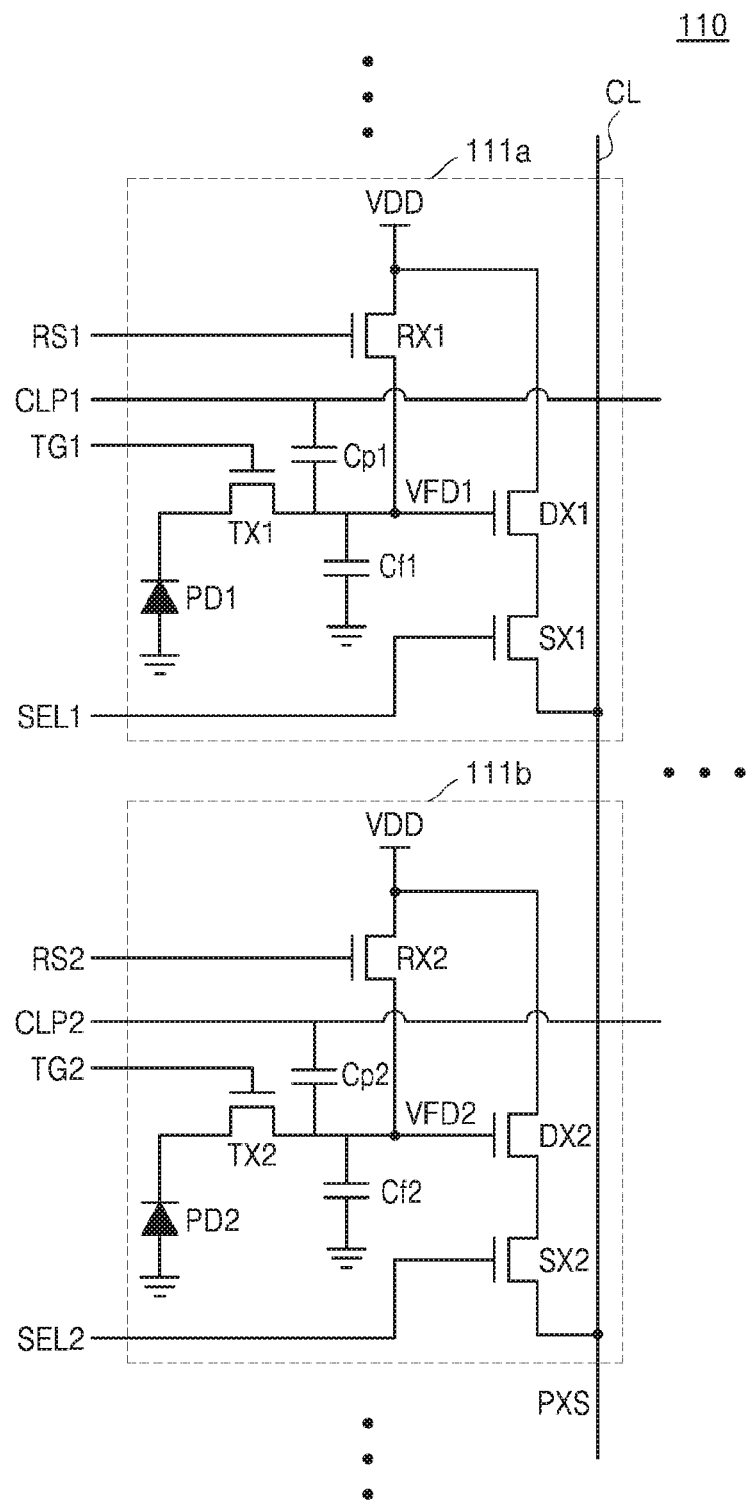
FIG. 4 illustrates a pixel array according to an exemplary embodiment of the inventive concept.

FIG. 4 illustrates a pixel array according to an exemplary embodiment of the inventive concept.

The pixel array 110 may include a first pixel 111a and a second pixel 111b, which are connected to a same column line CL. The first pixel 111a and the second pixel 111b may be pixels included in different rows. For example, the first pixel 111a and the second pixel 111b may be positioned in adjacent rows and at least one pixel is arranged between the first pixel 111a and the second pixel 111b. Although only one of the pixels included in each row is shown for convenience of explanation, each row may include a plurality of pixels.

Referring to FIG. 4, the first pixel 111a and the second pixel 111b may respectively include a reset transistor RX, a transfer transistor TX, a drive transistor DX, a selection transistor SX, a floating diffusion capacitor Cf, and a photodiode PD. In this case, the photodiode PD may be implemented as a different type of the light sensing device. In addition, the first pixel 111a and the second pixel 111b may receive a floating diffusion node voltage VFD and the clamp signal CLP, and may further include a clamp capacitor Cp connected with a clamp line. For example, the clamp line may extend in a row direction and be connected to pixels of different columns in a same row.

The pixel array 110 may reset the plurality of pixels in response to a control signal received from the row driver 120. The row driver 120 may respectively apply selection signals deactivated in gate terminals of a first selection transistor SX1 and a second selection transistor SX2 as a first selection signal SEL1 and a second selection signal SEL2. Hereinafter, a deactivated signal may be referred to as a low-level voltage (e.g. a voltage VSS, etc.) for logic low, and may be referred to as a high-level voltage (e.g. a voltage VDD, etc.) for logic high. Accordingly, outputs of the first pixel 111a and the second pixel 111b may be blocked. The row driver 120 may respectively apply selection signals deactivated in gate terminals of a first reset transistor RX1 and a second reset transistor RX2 as a first reset signal RS1 and a second reset signal RS2. Accordingly, a first floating diffusion node voltage VFD1 and a second floating diffusion node voltage VFD2 may be reset to the power supply voltage VDD.

The pixel array 110 may perform a clamping function in response to a control signal received from the row driver 120. For example, the pixel array 110 may clamp the pixel signal PXS by controlling a voltage output from the first pixel 111a during a read operation of the second pixel 111b.

According to an exemplary embodiment of the inventive concept, the row driver 120 may respectively apply selection signals deactivated in gate terminals of the first selection transistor SX1 and the second selection transistor SX2 as the first selection signal SEL1 and the second selection signal SEL2, and the row driver 120 may respectively apply selection signals deactivated in gate terminals of the first reset transistor RX1 and the second reset transistor RX2 as the first reset signal RS1 and the second reset signal RS2. In other words, the pixel array 110 may complete a reset operation.

Thereafter, the row driver 120 may apply the first clamp signal CLP1 to a first clamp capacitor Cp1 through the clamp line of the first pixel 111a and adjust a first floating diffusion node voltage VFD1. In addition, the first floating diffusion node voltage VFD1 may be adjusted according to capacitance values of the first clamp capacitor Cp1 and a first floating capacitor Cf1, which are connected to a first floating diffusion node. For example, in a case where the first floating diffusion node voltage VFD1 has the power supply voltage VDD in a reset state, the first floating diffusion node voltage VFD1 may be determined according to the following Equation 1.

$$VFD1 = VDD - \left\{ (V1 - V2) \times \frac{Cp1}{C_{total}} \right\} \quad \text{Equation 1}$$

In Equation 1, $C_{total}$ may be, for example, Cp1+Cf1, and may be a sum of all capacitances connected to the first floating diffusion node.

According to an exemplary embodiment of the inventive concept, in a case where the first clamp signal CLP1 is applied, the first floating diffusion node voltage VFD1 may be lower than a second floating diffusion node voltage VFD2. For example, in a case where the first voltage V1 is greater than the second voltage V2, the first floating diffusion node voltage VFD1, after a reset is completed, changes to a voltage lower than the power supply voltage VDD, which is a reset voltage. Since a second clamp signal CLP2 is not applied to the second pixel 111b, the second floating diffusion node voltage VFD2 may be maintained as the power supply voltage VDD in a reset state. Accordingly, the first floating diffusion node voltage VFD1 changes to a level lower than the power supply voltage VDD, the second floating diffusion node voltage VFD2 may be maintained at a level of the power supply voltage VDD.

In this case, the row driver 120 may transmit a deactivated signal to a first transfer transistor TX1 as a first transfer signal TG1 during the read operation of the second pixel 111b. A pixel that generates substantial image data according to a photocharge generated in the photodiode is the second pixel 111b. Therefore, to prevent an output signal of a first photodiode PD1 from being output as the pixel signal PXS, the first transfer transistor TX1 may be maintained in a turn-off state during the read operation of the second pixel 111b.

According to an exemplary embodiment of the inventive concept, the pixel signal PXS, which is a voltage output to the column line CL connected to the first pixel 111a and the second pixel 111b, may be determined based on the first floating diffusion node voltage VFD1 and the second floating diffusion node voltage VFD2, which will be described further with reference to FIG. 5.

Figure 5:
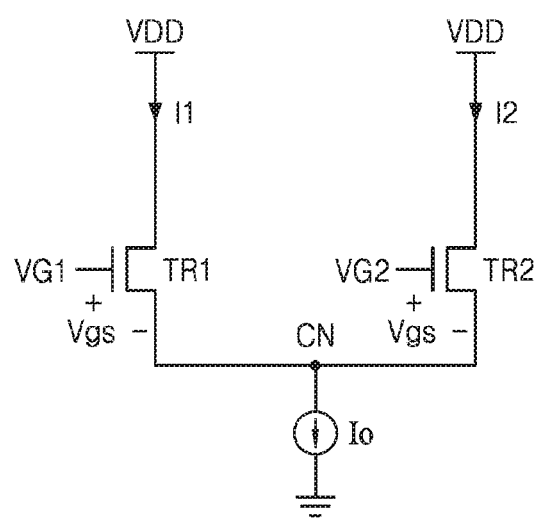
FIG. 5 illustrates an equivalent circuit of a winner-take-all circuit according to an exemplary embodiment of the inventive concept.

FIG. 5 illustrates an equivalent circuit of a winner-take-all circuit according to an exemplary embodiment of the inventive concept.

Referring to FIG. 5, two transistors shown may be the drive transistor DX included in the pixel according to exemplary embodiments of the inventive concept. For example, a first transistor TR1 and a second transistor TR2 may respectively be a first drive transistor DX1 included in the first pixel 111a and a second drive transistor DX2 included in the second pixel 111b. Hereinafter, for the convenience of explanation, it is assumed that the first transistor TR1 and the second transistor TR2 are implemented as NMOS transistors.

According to an exemplary embodiment of the inventive concept, in a case where a first gate voltage VG1 of the first drive transistor TR1 is greater than a second gate voltage VG2 of the second transistor TR2, a voltage applied to a common node CN is equal to the value obtained by subtracting a gate-source voltage Vgs from the first gate voltage VG1. In other words, VG1−Vgs=VCN may be obtained. In addition, in a case where the first gate voltage VG1 of the first drive transistor TR1 is greater than the second gate voltage VG2 of the second transistor TR2, a bias current Io may be a value based on a first current I1 and a value which does not relate to a second current I2. Therefore, only a transistor having a large gate voltage level may operate, and a transistor having a low gate voltage level may not operate. This may be called a winner-take-all circuit. For example, referring to FIG. 5 and FIG. 4, a principle in which the voltage is applied to the common node CN in FIG. 5 is similar to a principle in which the voltage is applied as the pixel signal PXS in FIG. 4. In this case, the first gate voltage VG1 and the second gate voltage VG2 may respectively correspond to the first floating diffusion node voltage VFD1 and the second floating diffusion node voltage VFD2 in FIG. 4. This is because the first selection transistor SX1 and the second selection transistor SX2 are in a turn-on state during the read operation of the second pixel 111b in FIG. 4.

Referring to FIG. 4 again, the pixel signal PXS output from the first pixel 111a and the second pixel 111b to the column line CL may be determined based on a high voltage between the first floating diffusion node voltage VFD1 and the second floating diffusion node voltage VFD2. As described, the first drive transistor DX1 and the second drive transistor DX2 may be source follower transistors in winner-take-all circuits. In this case, a voltage value based on the second floating diffusion node voltage VFD2 may be a clamp voltage VCLP. When the first floating diffusion node voltage VFD1 is greater than the clamp voltage VCLP, a voltage applied as the pixel signal PXS may be the first floating diffusion node voltage VFD1. Conversely, when the first floating diffusion node voltage VFD1 is lower than the clamp voltage CLP, the voltage applied as the pixel signal PXS may be the clamp voltage VCLP. For example, the first floating diffusion node voltage VFD1 may be a voltage obtained by subtracting a gate-source voltage of the first drive transistor DX1 from the first floating diffusion node voltage VFD1. The second floating diffusion node voltage VFD2 may also be a voltage obtained by subtracting a gate-source voltage of the second drive transistor DX2 from the second floating diffusion node voltage VFD2.

According to an exemplary embodiment of the inventive concept, the first pixel 111a may receive the first clamp signal CLP1 and generate a first pixel signal, and the second pixel 111b may generate a second pixel signal based on photocharge received from a second photodiode PD2. The pixel signal PXS generated by the first pixel 111a is based on the first clamp signal CLP1, and the pixel signal PXS generated by the second pixel 111b is based on the second photodiode PD2. For example, the first pixel signal may be a value obtained by subtracting the gate-source voltage of the first drive transistor DX1 from the first floating diffusion node voltage VFD1, and the second pixel signal may be a value obtained by subtracting the gate-source voltage of the second drive transistor DX2 from the second floating diffusion node voltage VFD2. Since the first drive transistor DX1 and the second drive transistor DX2 function as winner-take-all circuits, a high voltage of the first pixel signal and the second pixel signal is applied to the column line CL.

Figure 6:
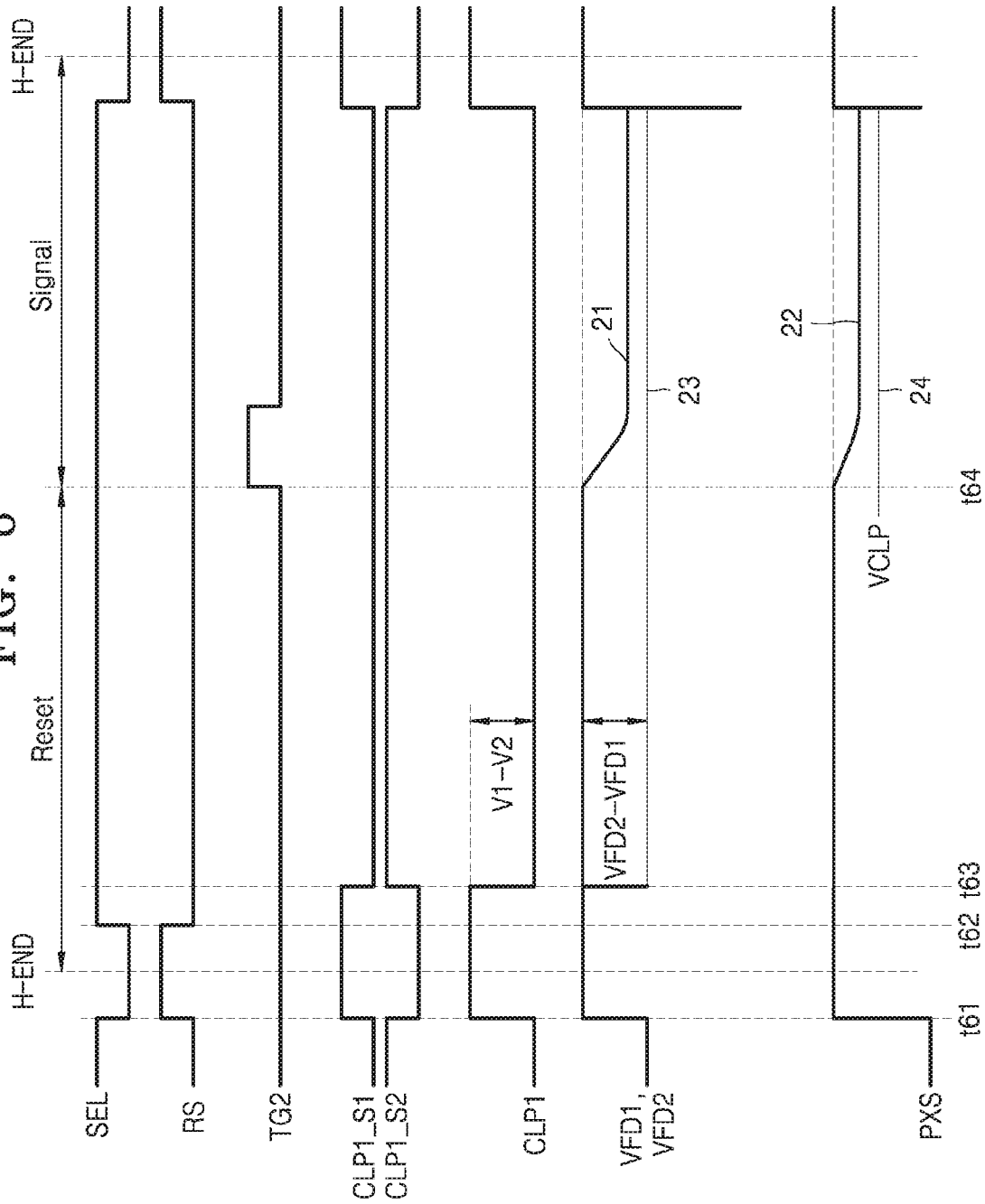
FIG. 6 is a timing diagram of an image sensor operation when a pixel signal is not clamped according to an exemplary embodiment of the inventive concept.

FIG. 6 is a timing diagram of an image sensor operation when a pixel signal is not clamped according to an exemplary embodiment of the inventive concept.

Referring to FIG. 6, the diagram shows voltages applied to different nodes during a time H-END of reading pixels in row units according to time, where the horizontal axis indicates time and the vertical axis indicates voltages. Hereinafter, a description will be provided according to time from the left side to the right side.

According to an exemplary embodiment of the inventive concept, the first pixel and the second pixel may be in a reset state. The row driver 120 may apply the selection signal SEL and the reset signal RS to the first pixel and the second pixel. For example, the selection signal SEL and the reset signal RS may be applied in an inverted state.

Referring to FIG. 6, at t61, the row driver 120 may apply a deactivated selection signal as the selection signal SEL and apply an activated reset signal as the reset signal RS so as to reset the first pixel and the second pixel. Thereafter, at t62, an activated selection signal may be applied as the selection signal SEL and a deactivated reset signal may be applied as the reset signal RS. Meanwhile, the deactivated selection signal SEL may always be applied to a remaining pixel except for the first pixel and the second pixel during the read operation of the second pixel.

In addition, at t61, the clamp controller 121 may make a first switch CLP_S1 short-circuit and make a second switch CLP_S2 be opened so as to apply the first voltage V1 to the clamp line of the first pixel. Likewise, in a case where a MUX is implemented as shown in FIG. 3B, the first voltage V1 may be selected and output. Accordingly, at t61, the clamp signal CLP1 of the first pixel has the first voltage V1, and a voltage based on a size of the first voltage V1, according to a charge distribution of a first clamp capacitor and a first floating diffusion node capacitor, is applied as the first floating diffusion node voltage VFD1. For example, in a case where the first voltage V1 is the power supply voltage VDD, the first floating diffusion node voltage VFD1 rises equally with the second floating diffusion node voltage VFD2. Both the first floating diffusion node voltage VFD1 and the second floating diffusion node voltage VFD2 may be reset to the power supply voltage VDD.

According to an exemplary embodiment of the inventive concept, at t63, the clamp controller 121 may apply the first voltage V1 to the first pixel and then the second voltage V2, which is lower than the first voltage V1. The timing generator 170 may transmit an activated selection signal SEL and a deactivated reset signal RST, and after a fixed time, the timing generator 170 may control the row driver 120 and/or the clamp controller 121 so as to apply the second voltage V2 to the first pixel by the clamp controller 121. The clamp controller 121 that has applied the first voltage V1, may make the first switch CLP1_S1 be opened and the second switch CLP1_S2 short-circuit so as to apply the second voltage V2 to the first pixel.

The voltage of the first clamp signal CLP1 and the first floating diffusion node voltage VFD1 applied to a first clamp line may decrease according to a decrease in a size of a voltage output from the clamp controller 121 at t63. In this case, since the second floating diffusion node voltage VFD2 is greater than the first floating diffusion node voltage VFD1, the pixel signal PXS is not changed. For example, a voltage level of the clamp signal CLP1 decreases by a difference between the first voltage V1 and the second voltage V2. In addition, the first floating diffusion node voltage VFD1 is reduced by a level similar to the difference between the first voltage V1 and the second voltage V2.

According to an exemplary embodiment of the inventive concept, after a reset is completed at t64, the row driver 120 may apply an activated transfer signal as a transfer signal TG2 of a second transfer transistor. As the second transfer transistor is turned on, a voltage 21 of the second floating diffusion node voltage VFD2 may be reduced by using photoelectrons generated by the second photodiode of the second pixel.

A voltage 22 obtained by subtracting the gate-source voltage of the second drive transistor from the voltage 21 which is the second floating diffusion node voltage VFD2 may be applied to the column line as the pixel signal PXS. Meanwhile, a voltage 24 obtained by subtracting the gate-source voltage of the first drive transistor from a voltage 23 which is the first floating diffusion node voltage VFD1 of the first pixel may be referred to as a clamp voltage VCLP. In this case, the voltage 21 of the second floating diffusion node voltage VFD2 is greater than the voltage 23 of the first floating diffusion node voltage VFD1. Therefore, the pixel signal PXS may be determined based on the photocharge generated by using the second photodiode of the second pixel regardless of the first pixel.

Figure 7:
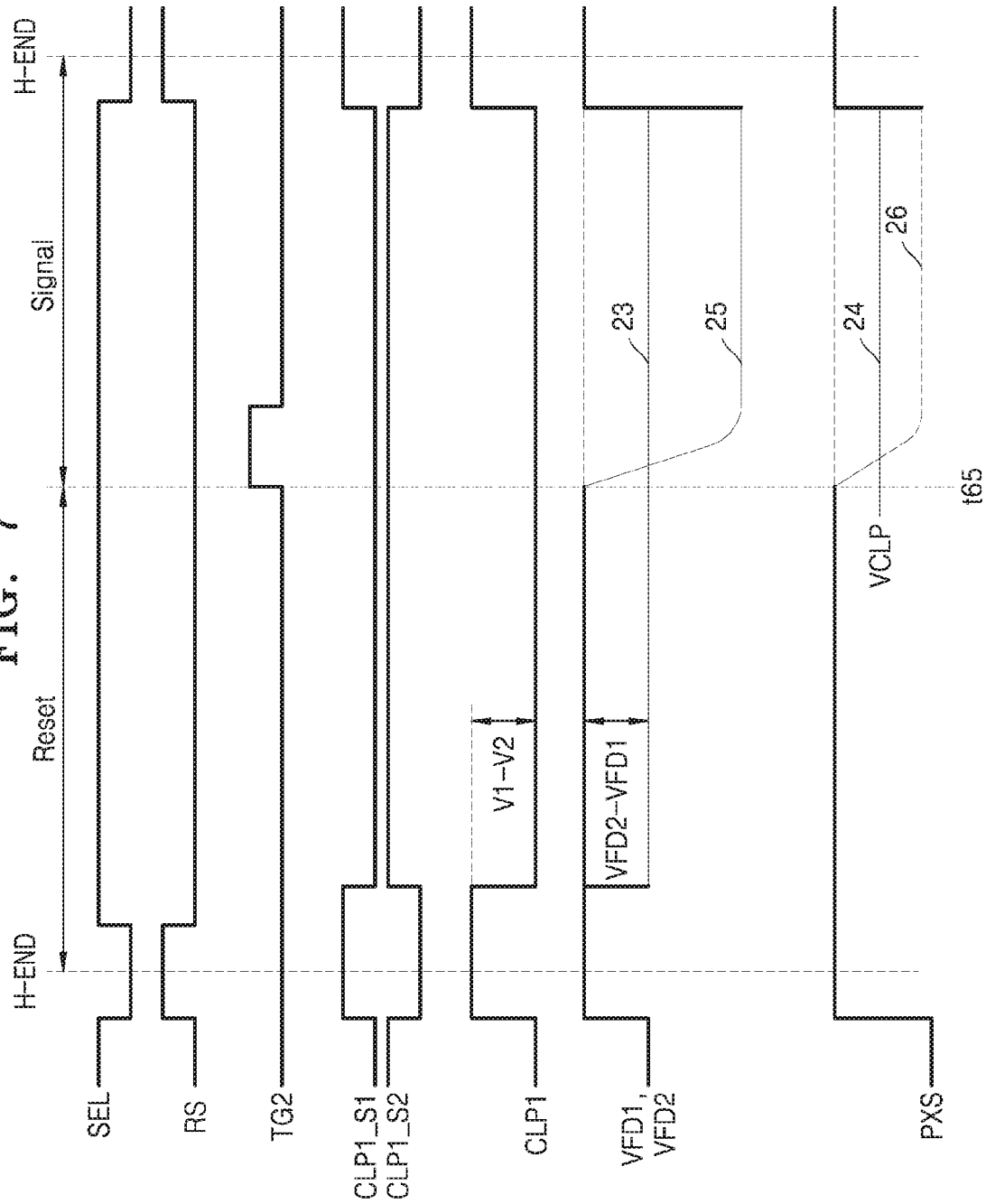
FIG. 7 is a timing diagram of an image sensor operation when a pixel signal is clamped according to an exemplary embodiment of the inventive concept.

FIG. 7 is a timing diagram of an image sensor operation when a pixel signal is clamped according to an exemplary embodiment of the inventive concept. Descriptions of the operation similar to that of FIG. 6 will be omitted for convenience of explanation.

According to an exemplary embodiment of the inventive concept, after a reset is completed at t565, the row driver 120 may apply an activated transfer signal as a transfer signal TG2 of the second transistor. The photoelectrons generated by the second photodiode of the second pixel may, as the second transistor is turned on, reduce a voltage 25 of the second floating diffusion node voltage VFD2 much more than the voltage 23 of the first floating diffusion node voltage VFD1. For example, when the light incident on the second photodiode is excessively bright, a large number of photoelectrons may be generated and the voltage value may be lowered. In this case, a voltage 24 obtained by subtracting the gate-source voltage of the first drive transistor from the voltage 23 which is the first floating diffusion node voltage VFD1 of the first pixel may be referred to as the clamp voltage VCLP.

On the other hand, a voltage 26 obtained by subtracting the gate-source voltage of the second drive transistor from the voltage 25 which is the second floating diffusion node voltage VFD2 is not applied to the column line as the pixel signal PXS. This is because the voltage 23 of the first floating diffusion node voltage VFD1 is greater than the voltage 25 of the second floating diffusion node voltage VFD2. Therefore, the pixel signal PXS is determined as the clamp voltage VCLP output by the first pixel regardless of the second pixel.

Accordingly, when excessive light comes in during the read operation of the second pixel, since the first pixel may operate such that the voltage of the pixel signal PXS may not be decreased below a predetermined value by using the clamp voltage VCLP, various pieces of noise (e.g. horizontal band noise) generated in the pixel may be prevented.

Figure 8:
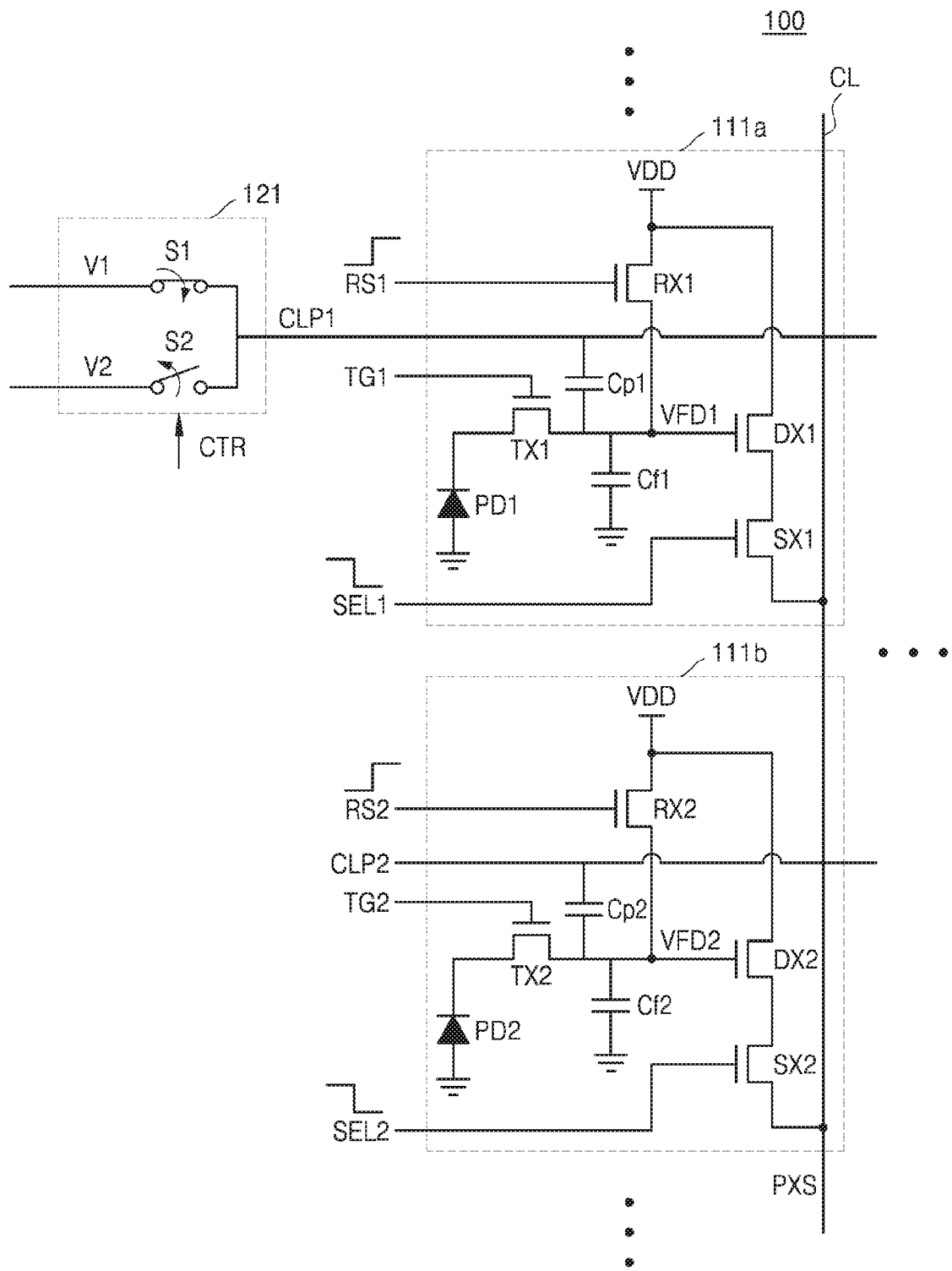
FIG. 8 illustrates the image sensor of FIG. 1 in a reset state according to an exemplary embodiment of the inventive concept.

FIG. 8 illustrates the image sensor of FIG. 1 in a reset state according to an exemplary embodiment of the inventive concept. Referring to FIG. 8, the image sensor 100 may include the first pixel 111a, the second pixel 111b, and the clamp controller 121.

The clamp controller 121 may be connected to the plurality of pixels in row units by using the clamp line extending in the row direction of the pixel array 110. For example, the clamp controller 121 may be connected to the first pixel 111a by using the first clamp line and be connected to the second pixel 111b by using the second clamp line.

According to an exemplary embodiment of the inventive concept, the timing generator 170 may control an output of the clamp controller 121 corresponding to the first pixel 111a to be the first voltage V1 or the second voltage V2 during the read operation of the second pixel 111b, and a switch included in the clamp controller 121 corresponding to a remaining pixel may be controlled to maintain an opened state or a state only outputting the first voltage V1.

According to an exemplary embodiment of the inventive concept, based on the control signal CTR received from the timing generator 170, the first clamp signal CLP1 may have the first voltage V1, the first reset signal RS1 and the second reset voltage RS2 may each have an activated reset signal, and the first selection signal SEL1 and the second selection signal SEL2 may each have a deactivated selection signal. The power supply voltage VDD may be applied to each of the first pixel 111a and the second pixel 111b. In other words, the first pixel 111a and the second pixel 111b may be in a reset state as described with reference to FIG. 6 and FIG. 7. In this case, the first voltage V1 may be applied to the second clamp signal CLP2.

Figure 9:
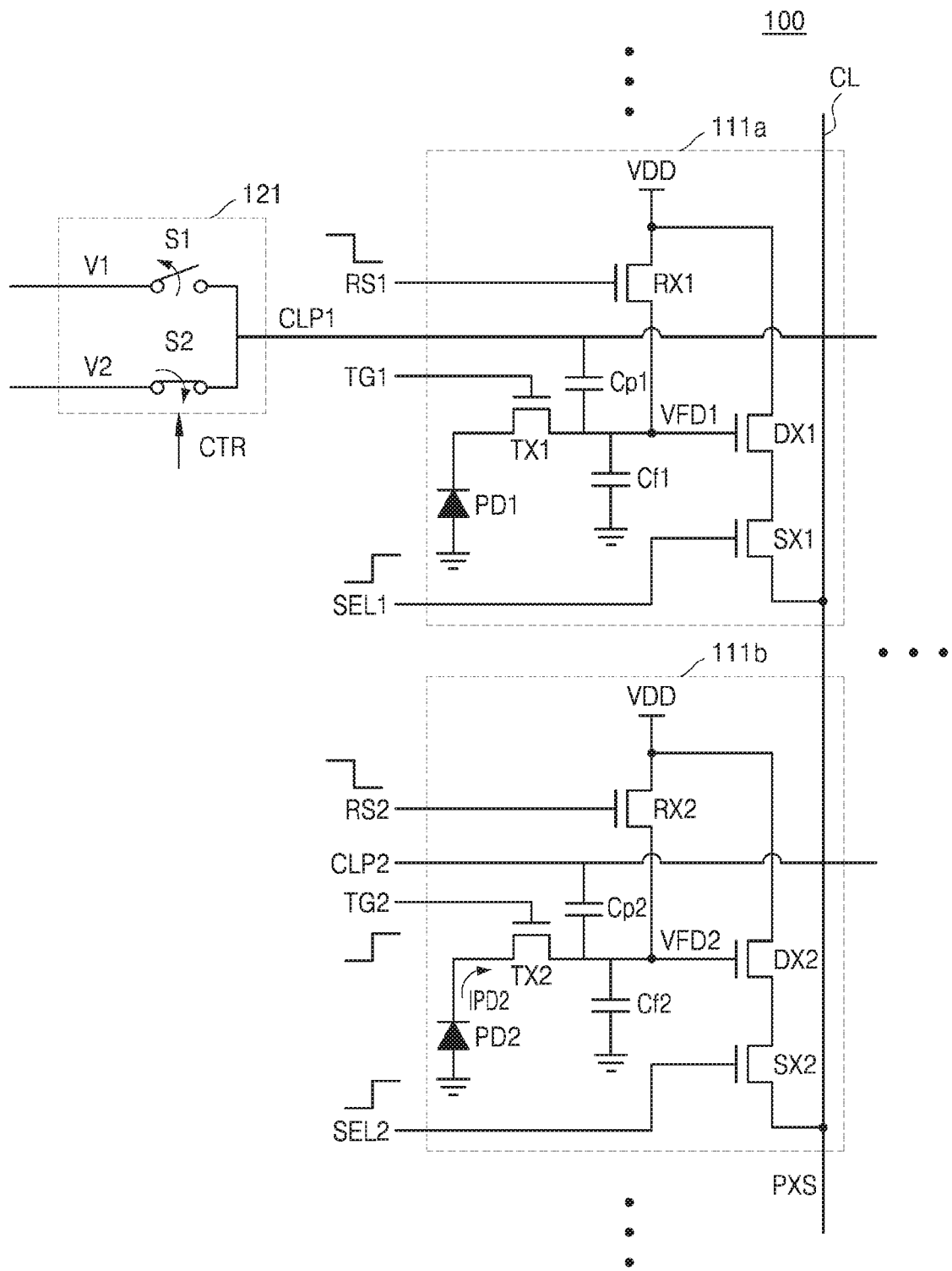
FIG. 9 illustrates the image sensor of FIG. 1 after a reset is completed according to an exemplary embodiment of the inventive concept.

FIG. 9 illustrates the image sensor of FIG. 1 after a reset is completed according to an exemplary embodiment of the inventive concept. Referring to FIG. 9, the image sensor 100 may include the first pixel 111a, the second pixel 111b, and the clamp controller 121.

According to an exemplary embodiment of the inventive concept, based on the control signal CTR received from the timing generator 170, the transfer signal TG2 of the second transfer transistor may have an activated transfer signal, the first clamp signal CLP1 may have the second voltage V2, the first reset signal RS1 and the second reset signal RS2 may be a deactivated reset signal, and the first selection signal SEL1 and the second selection signal SEL2 may be an activated selection signal. The power supply voltage VDD may be applied to each of the first pixel 111a and the second pixel 111b.

According to an exemplary embodiment of the inventive concept, the first floating diffusion node voltage VFD1 may be decreased as the second voltage V2, which is lower than the first voltage V1, is sequentially applied to the first clamp capacitor Cp1. On the other hand, the second photodiode PD2 may output a photocurrent IPD2 and a voltage corresponding to the photocurrent IPD2 according to photoelectrons, and reduce the second floating diffusion node voltage VFD2 below the power supply voltage VDD, which is the voltage of the reset state, as the second transfer transistor TX2 is turned on.

Meanwhile, the first drive transistor DX1 and the second drive transistor DX2 may be driven by the winner-take-all circuit described with reference to FIG. 5. When the first floating diffusion node voltage VFD1 is large, the pixel signal PXS is determined by an output of the first pixel 111a. When the second floating diffusion node voltage VFD2 is large, the pixel signal PXS is determined by an output of the second pixel 111b. In other words, according to an exemplary embodiment of the inventive concept, when the second photodiode PD2 emits a lot of photoelectrons and the second floating diffusion node voltage VFD2 is excessively reduced, pieces of noise that may occur in the pixel may be prevented by not reducing the pixel signal PXS below the clamp voltage VCLP, which is based on the first floating diffusion node voltage VFD1.

Figure 10:
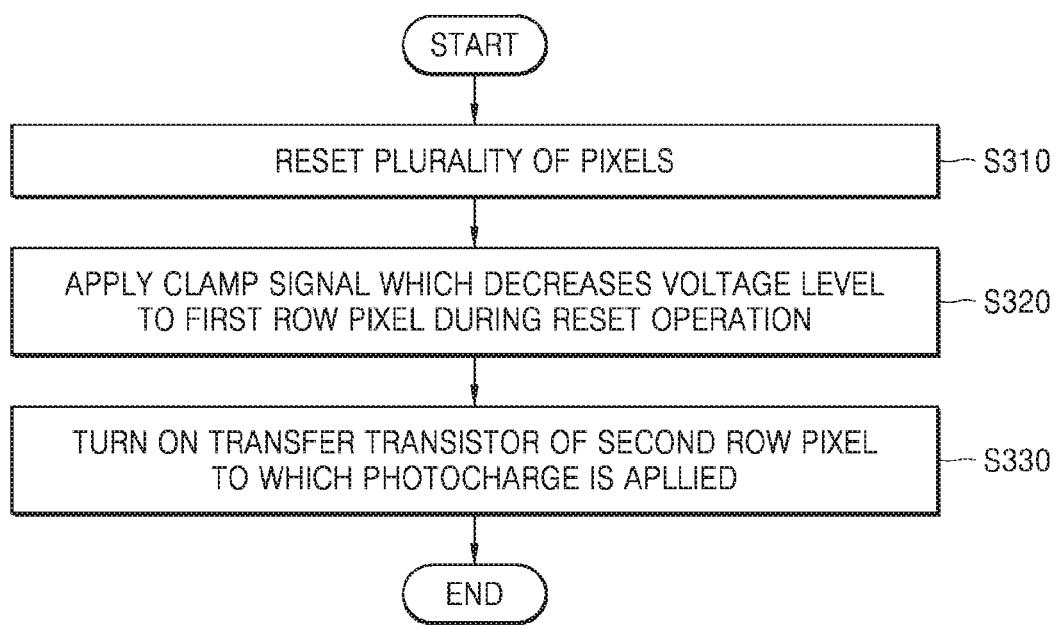
FIG. 10 is a flowchart of an operation of an image sensor according to an exemplary embodiment of the inventive concept.

FIG. 10 is a flowchart of an operation of an image sensor according to an exemplary embodiment of the inventive concept.

According to an exemplary embodiment of the inventive concept, in operation S310, the image sensor 100 may reset a plurality of pixels included in the pixel array 110. For example, the plurality of pixels may receive the power supply voltage VDD supplied through the reset transistor RX, and the voltage of the floating diffusion node may be reset to be the power supply voltage VDD.

Meanwhile, in operation S320, the image sensor 100 may apply the clamp signal CLP1, which decreases a voltage level from the first voltage V1 to the second voltage V2 which is lower than the first voltage V1 during a reset operation, to a first row pixel. For example, the first row pixel may include the first pixel 110a. In this case, the first floating diffusion node voltage VFD1 corresponding to the clamp signal CLP1 may be applied through the first clamp capacitor Cp1. For example, when the voltage level of the clamp signal CLP1 is decreased since the first clamp line is electrically connected to the first floating diffusion node, the first floating diffusion node voltage VFD1 is also decreased.

Meanwhile, in operation S330, the transfer transistor of the second row pixel to which the photocharge is applied may be turned on. For example, the second row pixel may include the second pixel 111b. A voltage corresponding to the voltage of either the first row pixel or the second row pixel may be applied as the pixel signal PXS when the second row pixel is turned on. In an exemplary embodiment of the inventive concept, when the first floating diffusion node voltage VFD1 is greater than the second floating diffusion node voltage VFD2, the first floating diffusion node voltage VFD1 may be applied to the column line as the pixel signal PXS. In other words, the pixel signal PXS may be determined by a voltage generated inside the image sensor 100, not by a signal according to light incident from outside by the second photodiode PD2. In an exemplary embodiment of the inventive concept, when the second floating diffusion node voltage VFD2 is greater than the first floating diffusion node voltage VFD1, the second floating diffusion node voltage VFD2 may be applied to the column line as the pixel signal PXS. In other words, a signal corresponding to light incident from outside may be applied to the column line as the pixel signal PXS.

Figure 11:
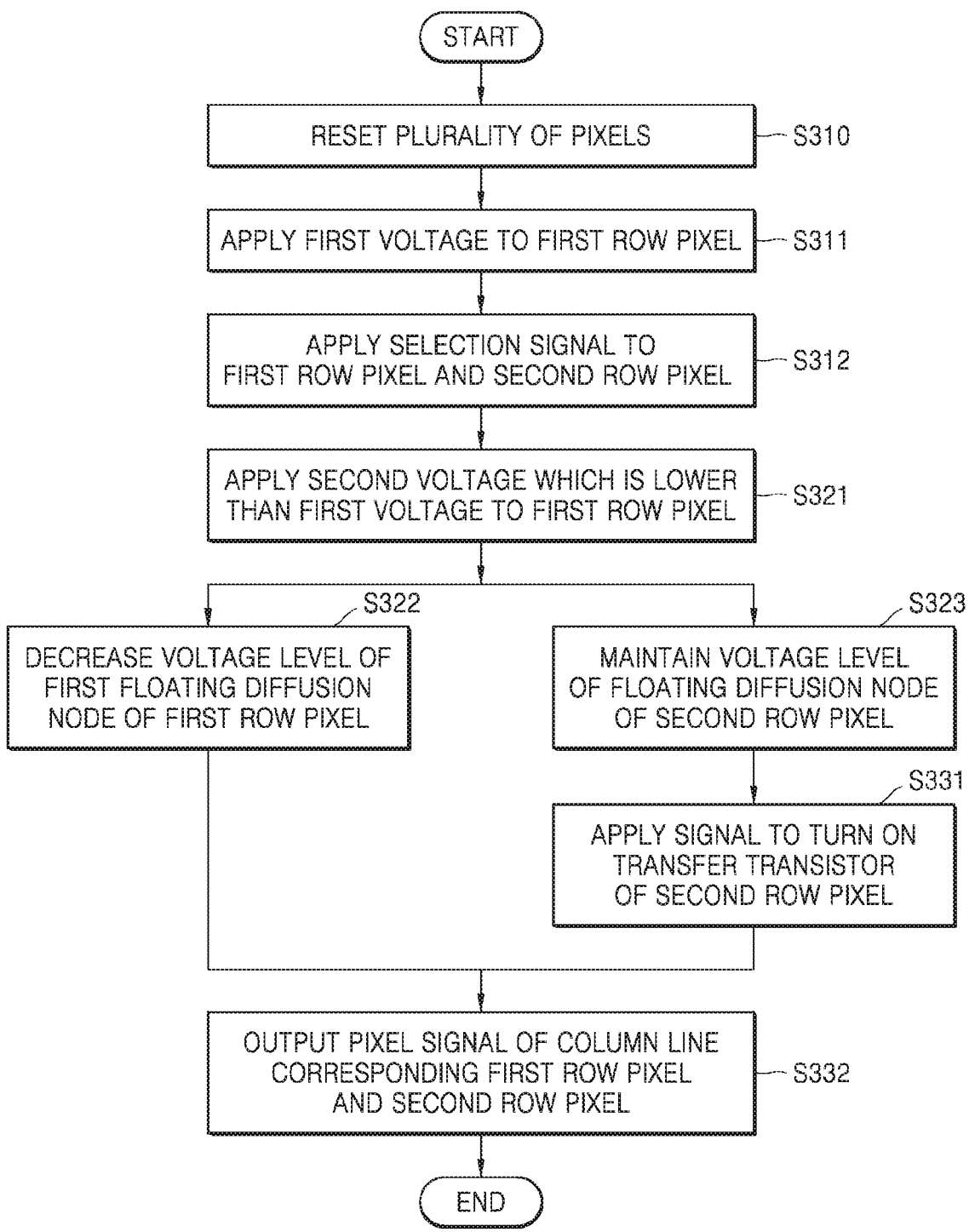
FIG. 11 is a flowchart of a particular operation method of an image sensor according to an exemplary embodiment of the inventive concept.

FIG. 11 is a flowchart of a particular operation method of an image sensor according to an exemplary embodiment of the inventive concept.

According to an exemplary embodiment of the inventive concept, in operation S310, the image sensor 100 may reset the plurality of pixels. In operation S311, during the reset operation, a selection transistor corresponding to the first row pixel and the second row pixel may apply a deactivated selection signal and reset the floating diffusion node to the power supply voltage VDD. In this case, the first voltage may be applied to the first row pixel.

Thereafter, in operation S312, the activated selection signal may be applied to the first row pixel and the second row pixel. In this case, the deactivated selection signal may be applied to a pixel except for the first row pixel and the second row pixel.

On the other hand, in operation S321, the clamp controller 121 may apply a second voltage V2 which is lower than the first voltage V1 to the first row pixel that has received the first voltage V1. In this case, in operation S322, since a voltage corresponding to the second voltage V2 may be applied to the first floating diffusion node, the first floating diffusion node voltage VFD1 may decrease. However, in operation S323, the second floating diffusion node voltage VFD2 is maintained at the power supply voltage VDD which is a voltage in the reset state. Thereafter, in operation S331, the row driver 120 applies a signal to turn on the second transfer transistor TX2 of the second row pixel. Accordingly, in operation S332, the pixel signal PXS of the column line corresponding to the first row pixel and the second row pixel is determined based on a high voltage of the first floating diffusion node voltage VFD1 and the second floating diffusion node voltage VFD2.

Figure 12:
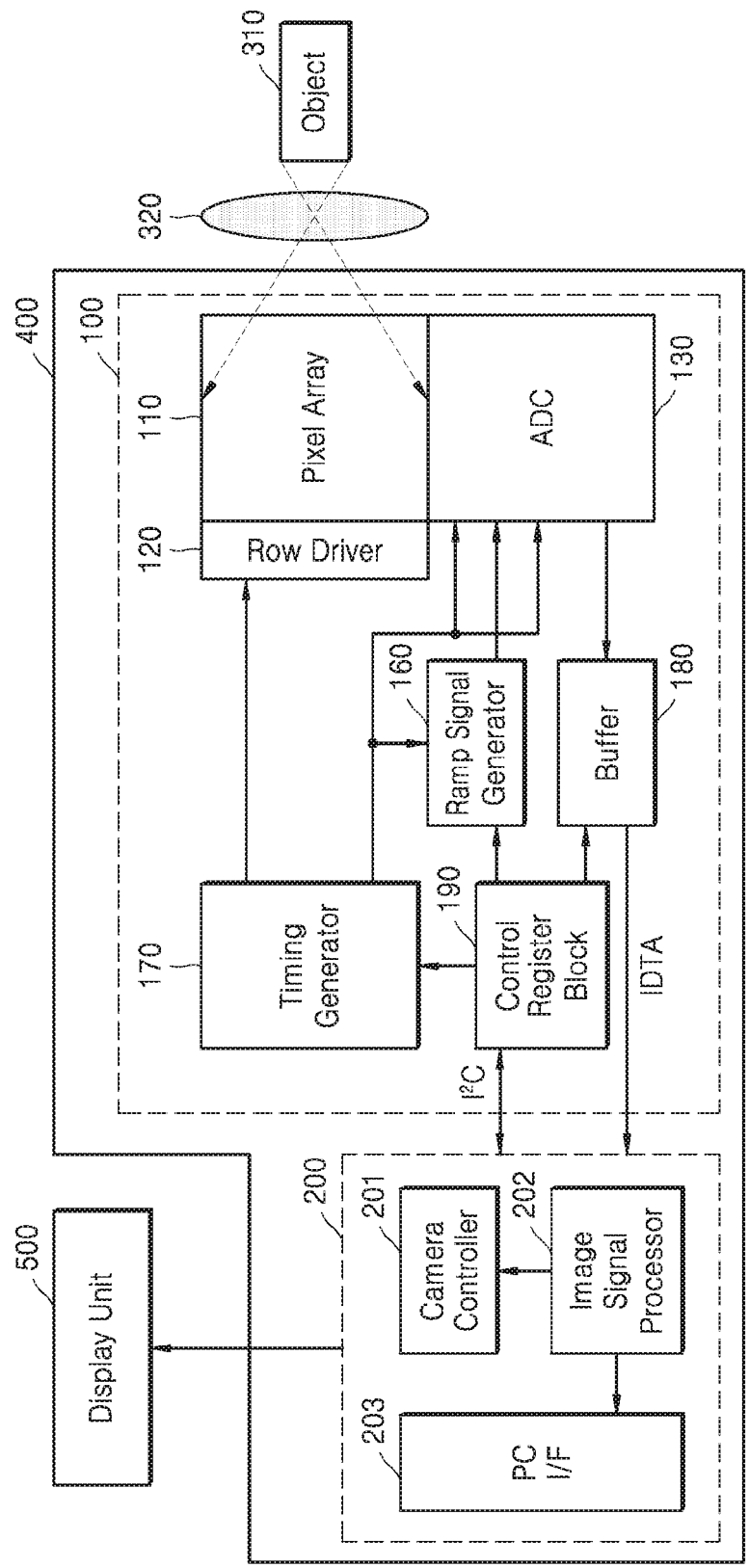
FIG. 12 is a block diagram of an image processing system according to an exemplary embodiment of the inventive concept.

FIG. 12 is a block diagram of an image processing system according to an exemplary embodiment of the inventive concept.

Referring to FIG. 12, an image processing system 400 may include an image sensor 100, an image processor 200, a display unit 500, and a lens 320.

The image sensor 100 may include the pixel array 110, the row driver 120, the ADC 130, the ramp signal generator 160, the timing generator 170, a control register block 190, and the buffer 180. The row driver 120 may include the clamp controller 121.

The image sensor 100 may sense an object 310 captured through the lens 320 by a control of the image processor 200, and the image processor 200 may output an image, which is sensed and output by the image sensor 100, to the display unit 500. The display unit 500 may include any apparatus capable of outputting images. For example, the display unit 500 may include a computer, a mobile phone, or other image output terminals.

The image processor 200 may include a camera controller 201, an image signal processor 202, and a PC OF 203. The camera controller 201 may control the control register block 190. For example, the camera controller 201 may control the image sensor 100, e.g., the control register block 190 by using an inter-integrated circuit (I2C). However, the inventive concept is not limited thereto, and various interfaces may be applied between the camera controller 201 and the control register block 190.

The image signal processor 202 may receive an image IDTA, which is an output signal of the buffer 180, process/handle an image such that the image looks good to humans, and output the processed/handled image to the display unit 500. Alternatively, the image signal processor 202 may receive a control signal from an external host via the PC OF 203 and provide the processed/handled image to the external host. In FIG. 12, the image signal processor 202 is shown in the image processor 200, but is not limited thereto. For example, the image signal processor 202 may be in the image sensor 100.

On the other hand, the image sensor 100 described with reference to FIG. 1 may be applied as the image sensor 100 of FIG. 12. The control register block 190 may output a control signal to the ramp signal generator 160, the timing generator 170, and the buffer 180 and control operations thereof. The control register block 190 may operate according to the control by the camera controller 201.

The pixel array 110, the row driver 120, the ADC 130, the timing generator 170, and the buffer 180 are described in detail with reference to the above-described exemplary embodiments, and thus, repeat descriptions thereof are omitted.

While the inventive concept has been particularly shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. An image sensor comprising:
   a pixel array comprising a first pixel and a second pixel which are connected to a first column line; and
   a row driver configured to control a read operation of the second pixel,
   wherein a voltage of the first column line is determined based on a comparison between a voltage of a floating diffusion node of the first pixel and a voltage of a floating diffusion node of the second pixel during the read operation of the second pixel, and the larger of the voltage of the floating diffusion node of the first pixel and the voltage of the flouting diffusion node of the second pixel based on the comparison is output as the voltage of the first common line.

2. The image sensor of claim 1, further comprising
   a first clamp line extending in a row direction from the row driver,
   wherein the first pixel further comprises a first capacitor connected between the first clamp line and the floating diffusion node of the first pixel.

3. The image sensor of claim 2, wherein the row driver comprises a clamp controller configured to sequentially apply a second voltage, which is lower than a first voltage, to the first clamp line, after applying the first voltage during the read operation of the second pixel.

4. The image sensor of claim 3, further comprising
   a timing generator,
   wherein the clamp controller applies the first voltage or the second voltage to the first clamp line according to a control signal received from the timing generator.

5. The image sensor of claim 3, wherein the row driver is configured to apply the second voltage after a reset transistor of the first pixel is turned on during the read operation of the second pixel.

6. The image sensor of claim 3, wherein the first voltage is a power supply voltage and the row driver is further configured to generate the second voltage.

7. The image sensor of claim 1, wherein the first pixel and the second pixel are pixels disposed in adjacent rows.

8. The image sensor of claim 1, wherein the row driver activates a selection signal of the first pixel and the second pixel during the read operation of the second pixel.

9. The image sensor of claim 1, wherein the voltage of the first column line is greater than or equal to a value obtained by subtracting a gate-source voltage of a transfer transistor of the first pixel from the voltage of the floating diffusion node of the first pixel during the read operation of the second pixel.

10. The image sensor of claim 1, wherein the first pixel is at least one pixel disposed in a first row that clamps a pixel voltage, and the second pixel is at least one pixel disposed in a second row that generates an output according to a photocurrent.

11. A pixel array comprising:
    a first row pixel configured to generate a first pixel signal in response to receiving a clamp signal from outside; and
    a second row pixel configured to generate a second pixel signal based on an output of a photodiode,
    wherein a voltage applied to a column line connected to the first row pixel and the second row pixel is a voltage based on at least one of the first pixel signal and the second pixel signal,
    wherein the clamp signal has a value of either a first voltage or a second voltage, and
    wherein the first pixel signal is a voltage value based on a difference between the first voltage and the second voltage.

12. The pixel array of claim 11, wherein the voltage applied to the column line is a high voltage between the first pixel signal and the second pixel signal.

13. The pixel array of claim 12, wherein
    the first row pixel receives the second voltage after the first row pixel and the second row pixel are reset, and
    the voltage applied to the column line is determined when the second row pixel receives a selection signal.

14. The pixel array of claim 13, wherein a transfer transistor of the second row pixel is turned on in response to the selection signal, and
    a voltage based on the first pixel signal and a voltage based on the second pixel signal are respectively a voltage obtained by subtracting a gate-source voltage from an output voltage of the first row pixel and a voltage obtained by subtracting a gate-source voltage from an output voltage of the second row pixel.

15. The pixel array of claim 11, wherein
    the second pixel signal is a voltage value corresponding to the output of the photodiode.

16. The pixel array of claim 11, wherein the first row pixel comprises a first capacitor connected between a first clamp line extending from a row driver and a floating diffusion node of the first row pixel.

17. The pixel array of claim 11, wherein a remaining pixel other than the first row pixel and the second row pixel receives an inactive selection signal during a read operation of the second row pixel.

18. An operation method of an image sensor comprising a plurality of pixels, the operation method comprising:
    resetting the plurality of pixels in a reset operation;
    applying a clamp signal, a voltage level of which decreases from a first voltage to a second voltage which is less than the first voltage during the reset operation, to a first capacitor in a first row pixel to adjust a voltage of a floating diffusion node of the first row pixel, wherein the floating diffusion node is connected to the first capacitor; and
    turning on a transfer transistor to receive an output of a photodiode of a second row pixel.

19. The operation method of claim 18, further comprising:
    reducing the voltage of the first floating diffusion node of the first row pixel to correspond to the second voltage.

20. The operation method of claim 19, wherein the first row pixel and the second row pixel apply a higher voltage among respective output voltages to a column line corresponding to the first row pixel and the second row pixel.

* * * * *